United States Patent
Gür et al.

(10) Patent No.: US 8,563,183 B2
(45) Date of Patent: Oct. 22, 2013

(54) INTEGRATED DRY GASIFICATION FUEL CELL SYSTEM FOR CONVERSION OF SOLID CARBONACEOUS FUELS

(75) Inventors: Turgut M. Gür, Palo Alto, CA (US); Reginald E. Mitchell, Oakland, CA (US); Andrew C. Lee, Stanford, CA (US); Siwen Li, Cupertino, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 619 days.

(21) Appl. No.: 12/215,681

(22) Filed: Jun. 26, 2008

(65) Prior Publication Data
US 2009/0004529 A1    Jan. 1, 2009

Related U.S. Application Data

(60) Provisional application No. 60/937,459, filed on Jun. 26, 2007.

(51) Int. Cl.
*H01M 8/06* (2006.01)
*H01M 8/12* (2006.01)

(52) U.S. Cl.
USPC ............ 429/419; 429/417; 429/426; 429/479

(58) Field of Classification Search
USPC ................ 429/416–417, 419, 426, 479
See application file for complete search history.

(56) References Cited

U.S. PATENT DOCUMENTS

| | | | |
|---|---|---|---|
| 6,187,465 B1 * | 2/2001 | Galloway | 429/410 |
| 6,365,289 B1 * | 4/2002 | Lee et al. | 429/429 |
| 7,163,758 B2 | 1/2007 | Steinberg | |
| 2004/0202914 A1 | 10/2004 | Sridhar et al. | |
| 2004/0265651 A1 | 12/2004 | Steinberg | |
| 2006/0019132 A1 | 1/2006 | Lipilin et al. | |
| 2006/0234098 A1 | 10/2006 | Gur | |
| 2006/0257702 A1 * | 11/2006 | Gur | 429/27 |
| 2007/0099038 A1 * | 5/2007 | Galloway | 429/17 |
| 2007/0269688 A1 | 11/2007 | Lipilin et al. | |
| 2008/0022593 A1 | 1/2008 | Gur | |

FOREIGN PATENT DOCUMENTS

WO    WO 02065564 A2 *    8/2002

OTHER PUBLICATIONS

Thermodynamic Considerations for the Development of a Carbon-Based Solid Oxide Fuel Cell System by Jennifer Wade and Klaus Lackner, published 2005 in Proceedings of the International Technical Conference on Coal Utilizations & Fuel Systems, pp. 831-841.*

* cited by examiner

*Primary Examiner* — Raymond Alejandro
*Assistant Examiner* — Helen McDermott
(74) *Attorney, Agent, or Firm* — Lumen Patetn Firm (57) ABSTRACT

An integrated dry gas fuel cell (IDG-FC) is provided. The IDG-FC includes at least one solid oxide fuel cell having an anode, a cathode and an electrolyte membrane disposed between the anode and the cathode. The IDG-FC further includes a conversion bed, where carbon dioxide gas is provided to the conversion bed to convert carbon monoxide gas from the carbon dioxide gas. Solid carbonaceous fuel is provided to the conversion bed to promote the gas conversion. The carbon monoxide is provided as fuel to the anode, and air is supplied to the cathode to provide oxygen for oxidation of the carbon monoxide at the anode to generate electric power. This new process does not require water, and supplies the oxygen required for the oxidation reaction through an ionically selective solid oxide electrolyte membrane.

14 Claims, 5 Drawing Sheets

INTEGRATED DRY GASIFICATION FUEL CELL SYSTEM FOR CONVERSION OF SOLID CARBONACEOUS FUELS

CROSS-REFERENCE TO RELATED APPLICATIONS

This application is cross-referenced to and claims the benefit from U.S. Provisional Patent Application 60/937,459 filed Jun. 26, 2007, which is hereby incorporated by reference.

FIELD OF THE INVENTION

The invention generally relates to fuel cells. In particular, the invention fuel cells for solid carbonaceous fuel conversion.

BACKGROUND

It is known that solid carbonaceous fuels are one of the cheapest and most abundant sources of energy. Currently, coal production provides a majority of the electricity produced in the United States, about 52%, while more than 70% of the electricity produced in India and China is generated from coal. Because of the substantial resources of coal in the United States, it is projected that the United States coal reserves will last about 250 years at the current consumption rate, and coal's share in the world's energy usage will continue to be significant over the next several decades. As the energy demands of the world grow, the coal consumption rate is expected to increase.

Conventional coal-based power generation technologies suffer from Carnot constraints that ultimately result in low conversion efficiencies, where they ordinarily require multiple processing steps to convert the chemical energy of coal to electricity. Since air is employed for the combustion of coal in these processes, the flue gases typically contain 10-15% $CO_2$, with the remaining being nitrogen, where the nitrogen and $CO_2$ then need to be separated by expensive and energy intensive processes in order to capture the $CO_2$. Typically, sub-critical coal fired power plants operate with efficiencies of 33-35%. More advanced coal technologies have slightly improved efficiencies that may reach up 38% for ultra-super critical and 42% for integrated gas combined cycle (IGCC) processes. IGCC processes employ pure oxygen, instead of air, for gasification. Since no nitrogen enters the process stream, the flue gas is primarily made of $CO_2$, and the separation step is not needed to capture the $CO_2$. However, there are known to be expensive technologies with capital costs in excess of $1700/kW without $CO_2$ capture and more than $2200/kW with $CO_2$ capture.

IGCC technology addresses and improves both the conversion efficiency and ease of $CO_2$ capture, at the expense of separating oxygen from air prior to gasification. Although it offers only a modest gain in efficiency (to around 40-42%), IGCC consumes large amounts of water required for the steam gasification step to produce a mixture of CO and hydrogen. Typically, 60-70% of the product stream from this process is made of $CO_2$ and $H_2O$, with the remainder being CO and hydrogen.

FutureGen (a public-private partnership to design, build, and operate the world's first coal-fueled, near-zero emissions power plant) and other integrated gasification fuel cell (IGFC) systems currently under development take advantage of the IGCC approach by combining the process line with a solid oxide fuel cell (SOFC) to improve the overall conversion efficiency of the system. One serious consequence of theses technologies is that these approaches require the consumption of large quantities of water for the coal gasification step. Water is a precious natural resource that is not readily available in sufficient quantities at every geographic location. Further, unprocessed water also lacks the necessary quality required for the gasification step in IGCC, FutureGen and IGFC processes. Water used in the gasification step needs to undergo expensive pretreatment for purification, which adds another undesirable cost factor. Moreover, all three of these processes require the use of oxygen during the gasification step to provide the heat necessary to drive the highly endothermic gasification reaction.

Efforts to address global climate change are in place requiring that the $CO_2$ that is normally generated during the combustion and/or gasification processes in coal-based power plants must be removed from the exhaust gases and stored indefinitely in order to slow down the rate of increase in the level of carbon dioxide in the atmosphere. Carbon capture and sequestration (CCS) is likely to be required of all new coal-based power plants. Regulations could require that all existing power plants be retrofit with a CCS system.

Carbon capture involves separating the $CO_2$ from the exhaust gas of a power plant before releasing the gas to the atmosphere. Geologic formations can provide permanent storage sites for $CO_2$. Primary targets for geologic sequestration of $CO_2$ include petroleum reservoirs, saline aquifers and deep, unminable coal seams. A recent DOE survey has identified sites with the potential to store over 3,500 billion tons of $CO_2$.

Considering that all coal-based power plants emit copious amounts of the green house gas $CO_2$ into the environment at the rate of about 2.7 tons of $CO_2$ for every ton of coal consumed, there is a need to develop technologies that increase the efficiency of coal conversion, thereby reducing $CO_2$ emissions with a proportionate amount. Further, considering the ever-decreasing availability of water and the need for expensive purification, there is a need to develop technologies that do not require water for these expensive processes.

SUMMARY OF THE INVENTION

To address the current needs for clean, dry energy production from coal-based power generation, an integrated dry gas fuel cell (IDG-FC) is provided. The IDG-FC includes at least one solid oxide fuel cell having an anode, a cathode and an electrolyte membrane, where the membrane is disposed between the anode and the cathode. The IDG-FC further includes a conversion bed, where carbon dioxide gas is provided to the conversion bed and the conversion bed converts carbon monoxide gas from the carbon dioxide gas. Solid carbonaceous fuel is provided to the conversion bed to promote the gas conversion. The carbon monoxide is provided as fuel to the anode, and air is supplied to the cathode to provide oxygen for oxidation of the carbon monoxide at the anode. Electrons released by oxygen at the anode/electrolyte interface travel through the external circuit of the fuel cell back to the cathode, generating electric power.

In one embodiment of the invention, the fuel cell further includes an air exhaust from the cathode, where heat energy from the exhaust air is reclaimed. The reclamation includes providing the cathode heat energy to a boiler of a Rankine engine.

In another embodiment, the fuel cell further includes a product stream output from the anode, where heat energy from the product stream output is reclaimed. Here, the reclamation includes providing the anode heat energy to a boiler of a Rankine engine.

In one aspect of the invention, the electrolyte membrane is a selective membrane, where the membrane only transports oxide ions. The membrane supplies oxygen to the anode for an anodic oxidation of the carbon monoxide provided from the conversion bed. The membrane can be elecrolyte material that can include zirconia-based electrolytes, zirconia-based electrolytes doped with alkali or rare earth oxides, zirconia-based electrolytes in a cubic fluorite phase, ceria-based electrolytes, ceria-based electrolytes doped rare earth oxides, ceri-base electrolytes in a cubic fluorite phase, lanthanum gallate-based electrolytes, lanthanum gallate-based electrolytes doped with oxides of aliovalent metals, lanthanum gallate-based oxides of perovskite phase, zirconia-based electrolytes in a pyrocholore phase, lanthanum silicate-based electrolytes, lanthanum silicate-based electrolytes doped with oxides of aliovalent metals, or lanthanum silicate-based electrolytes in an apatite phase.

In another aspect of the invention, the carbon dioxide is provided to the conversion bed from a carbon dioxide reclamation element. Here, a waste-heat recovery element is disposed between the carbon dioxide reclamation element and the conversion bed, where the carbon dioxide is heated before entering the conversion bed, and the gas conversion is further promoted.

In another aspect, the carbon dioxide gas is restricted from entering the conversion bed.

In a further aspect, the solid carbonaceous fuel can include anthracite, biomass, coal, char, charcoal, forest residues, industrial carbon-containing wastes, lignite, municipal solid wastes, paper pulp, peat, petroleum coke, refuse-derived wastes, sewage sludge, solid wastes, or waste plastics.

According to another embodiment, the fuel cell is a fuel cell bundle, where the bundle has at least one fuel cell disposed inside the conversion bed and at least one fuel cell disposed at an exit of the conversion bed. In one aspect of the current embodiment, a water supply to the conversion bed is provided, where the solid carbonaceous fuel reacts with the water and hydrogen is formed, and the hydrogen is oxidized in the internal fuel cell and converted back to the water, where the power generation rate is increased.

In another embodiment, the conversion bed further includes an oxygen input, where the oxygen is provided to the conversion bed to provide combustion heat and promote the gas conversion.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

An integrated dry gasification fuel cell (IDG-FC) is provided that does not require the use of steam for the gasification process, while improving system conversion efficiency. The IDG-FC does not require the external use of pure oxygen gas flow into the gasifier along with steam. By using the selective oxygen transport property of solid oxide electrolytes, the IDG-FC eliminates the need for the expensive, energy intensive process of separating oxygen from air prior to the gasification step. The IDG-FC eliminates the need for water resources and the associated costs and environmental impacts, and provides a desirable alternative where water is scarce or too uneconomical to employ.

The present invention has the advantage of utilizing all forms of carbon containing solid fuels in the IDG-FC process. In the context of this invention, a solid carbonaceous fuel is defined as a solid fuel whose carbon content is more than 20% by weight on dry-basis, and preferably more than 40% by weight on dry-basis, where "dry" is upon the removal of water or moisture. Examples of solid carbonaceous fuels include, but not limited to, anthracite, biomass, coal, char, charcoal, forest residues, industrial carbon-containing wastes, lignite, manure, municipal solid wastes, paper pulp, peat, petroleum coke, refuse-derived wastes, saw dust, sewage sludge, solid wastes, or waste plastics. Similarly, examples of biomass include, but nor limited to wood, switchgrass, corn stover, rice straw, olive pits, grass, agricultural residues, and shells of almonds, walnuts, coconuts and other types of nuts.

Another important aspect of the IDG-FC process is the integration of a solid oxide fuel cell (SOFC) in order to improve the overall system conversion efficiency. The solid oxide electrolyte employed in the fuel cell is a selective membrane that only transports oxide ions and supplies the oxygen for the anodic oxidation of CO generated during the dry gasification step. The membrane can be elecrolyte material that can include zirconia-based electrolytes, zirconia-based electrolytes doped with alkali or rare earth oxides, zirconia-based electrolytes in a cubic fluorite phase, ceria-based electrolytes, ceria-based electrolytes doped rare earth oxides, ceri-base electrolytes in a cubic fluorite phase, lanthanum gallate-based electrolytes, lanthanum gallate-based electrolytes doped with oxides of aliovalent metals, lanthanum gallate-based oxides of perovskite phase, zirconia-based electrolytes in a pyrocholore phase, lanthanum silicate-based electrolytes, lanthanum silicate-based electrolytes doped with oxides of aliovalent metals, or lanthanum silicate-based electrolytes in an apatite phase.

Predominantly oxide-ion conducting solids have been known to exist for almost a century. Among these solids, zirconia-based electrolytes have widely been employed as electrolyte material for solid oxide fuel cells. Zirconium dioxide has three well-defined polymorphs, with monoclinic, tetragonal and cubic structures. The monoclinic phase is stable up to about 1100° C. and then transforms to the tetragonal phase. The cubic phase is stable above 2200° C. with a $CaF_2$ structure. The tetragonal-to-monoclinic phase transition is accompanied by a large molar volume (about 4%), which makes the practical use of pure zirconia impossible for high temperature refractory applications. However, addition of 8-15 mole % of alkali or rare earth oxides (e.g., CaO, $Y_2O_3$, $Sc_2O_3$) stabilizes the high temperature cubic fluorite phase to room temperature and eliminates the undesirable tetragonal-to monoclinic phase transition at around 1100° C. The dopant cations substitute for the zirconium sites in the structure.

When divalent or trivalent dopants replace the tetravalent zirconium, a large concentration of oxygen vacancies is generated to preserve the charge neutrality of the crystal. It is these oxygen vacancies that are responsible for the high ionic conductivity exhibited by these solid solutions. These materials also exhibit high activation energy for conduction that necessitates elevated temperatures in order to provide sufficient ionic transport rates. The electronic contribution to the total conductivity is several orders of magnitude lower than the ionic component at these temperatures. Hence, these materials can be employed as solid electrolytes in high temperature electrochemical cells.

The chemical potential difference of oxygen across the solid oxide electrolyte is a measure of the open circuit potential given by the Nernst Equation, $$E=-(RT/nF)\ln(P_{O_2,anode}/P_{O_2,cathode}) \quad (1)$$

where E is the equilibrium potential of the fuel cell under open circuit conditions, R is the gas constant, F is Faraday's constant, n is the number of electrons per mole (in the case of $O_2$, n=4), and $P_{O_2}$ denotes the partial pressure of oxygen. At the anode, the equilibrium oxygen partial pressure is governed by the $CO/CO_2$ ratio at the operating temperature and total pressure, while at the cathode it is fixed by the oxygen activity in air.

The Boudouard reaction, written in global form in (2), is employed in the IDG-FC process in order to generate carbon monoxide from the carbon dioxide that enters the gasifier.

$$CO_2(g)+C(s) \rightarrow 2CO(g) \quad (2)$$

This global chemical reaction is kinetically slow compared to carbon (or coal) combustion. However, the presence of large amounts of solid carbon relative to gas allows for a small conversion of the solid carbonaceous fuel to produce large changes in gas concentration. There are several benefits of using the Boudouard reaction products directly in the SOFC. First, no separate gasifier is needed thus reducing geometric space requirements. Secondly, the activity of carbon is fixed at one, and within the bed there is a constant conversion of $CO_2$ to CO. This works to increase the CO activity in the flow direction, thus maintaining the CO concentration and providing more power density.

Figure 1:
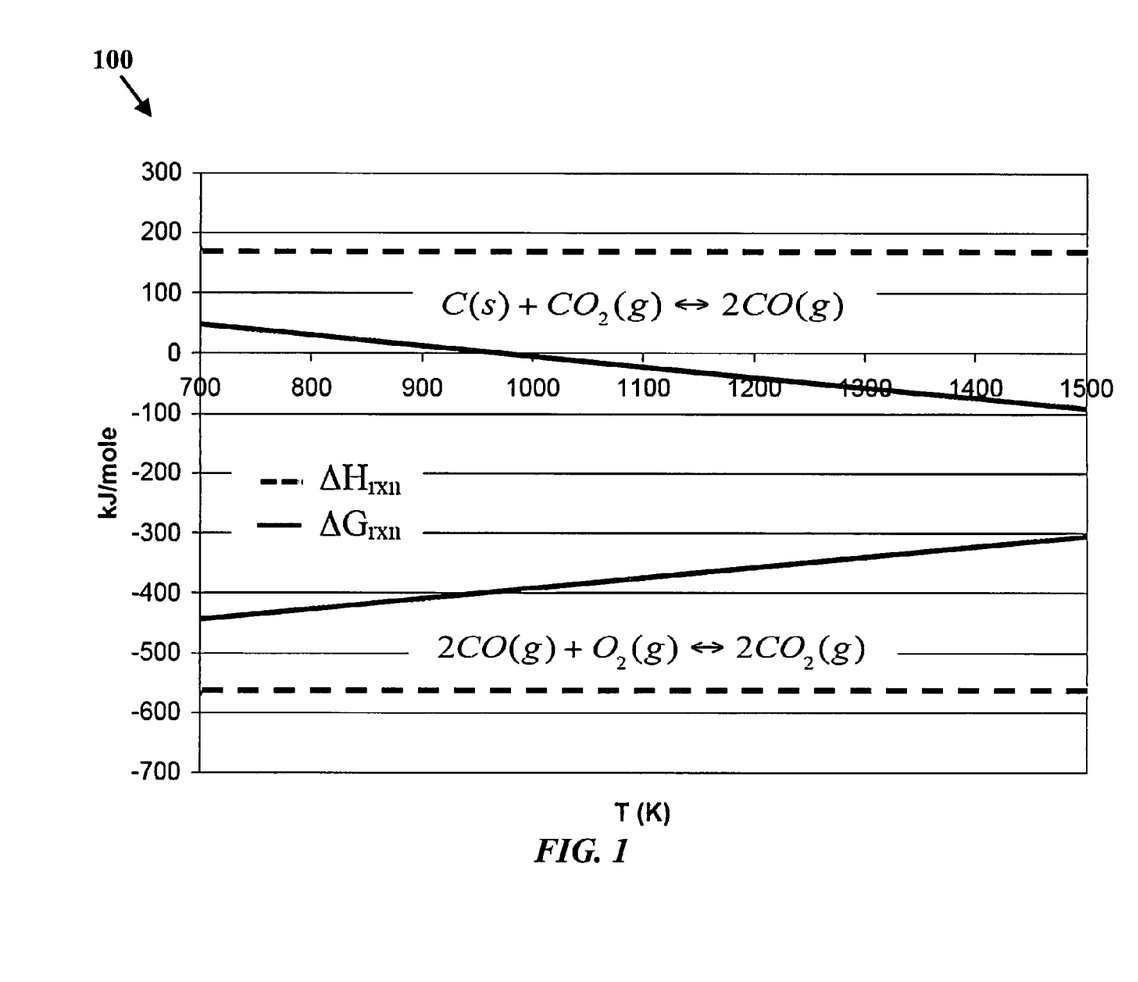
FIG. 1 shows a temperature dependence of Gibbs free energy and enthalpy for the Boudouard and CO oxidation reactions according to the present invention.

Referring now to the figures, FIG. 1 shows a temperature dependence chart 100 of Gibbs free energy and enthalpy for the Boudouard and CO oxidation reactions. FIG. 1 shows the heat of reaction and free energy for the Boudouard reaction at temperatures of interest, and compares these values with the enthalpy and free energy for CO oxidation. The energy required to drive the endothermic Boudouard reaction ($\Delta H_{rxn}$), shown in dashed lines, is nearly constant at about 170 kJ per mole of carbon gasified. The free energy of reaction ($\Delta G_{rxn}$), shown in solid lines, indicates that CO formation is favored above about 1000° K, and becomes more favorable with higher temperatures. At a gasifier design temperature of 900° C. (1173° K), the equilibrium $CO$-to-$CO_2$ molar ratio is about 32-to-1 for this reaction when there is an excess of carbon maintained in the gasifier. This $CO/CO_2$ mixture is slightly diluted with gases released from the coal during devolatilization ($H_2O$, $H_2$, $H_2S$, COS, HCl, $Cl_2$, $SO_2$, $NH_3$, $N_2$ and low molecular weight hydrocarbons), but generally not to a large extent.

As noted in FIG. 1, the highly exothermic heat of reaction for the CO oxidation reaction (−560 kJ/mole) is more than sufficient to meet the endothermic heat requirement for the Boudouard reaction. The carbon monoxide produced via the gasification reactions is employed as fuel in a solid oxide fuel cell to generate electric power. Air is supplied to the cathode of the fuel cell, providing oxygen for CO oxidation at the anode. The overall course of the electrochemical oxygen reduction reaction at the cathode is given by:

$$O_2(g)+2V_O^{\cdot\cdot}+4e^- \rightarrow 2O_O^X \quad (3)$$

Oxygen ions, $O_O^X$, are transported across the solid electrolyte of the fuel cell from the cathode to the anode and oxygen vacancies, $V_O^{\cdot\cdot}$, migrate under the influence of the chemical potential gradient from the anode to the cathode. The oxygen ions are consumed at the anode via reactions with the CO produced in the coal bed. The overall course of the electrochemical reactions that take place at the anodic surface are described by (4).

$$CO(g)+O_O^X \rightarrow CO_2(g)+V_O^{\cdot\cdot}+2e^- \quad (4)$$

The overall reaction sequence for carbon conversion in the IDG-FC is the sum of reactions (2) and (4), and can be represented as $$C(s)+2O_O^X \rightarrow CO_2(g)+2V_O^{\cdot\cdot}+4e^- \quad (5)$$

while the oxygen supplied for this conversion is given by reaction (3). So for every carbon atom freshly supplied by coal is reacted, four electrons travel through the external circuit of the fuel cell generating electricity.

Any hydrogen produced in the coal bed will be oxidized electrochemically to water at the anodic surface via reaction (6) generating additional electricity.

$$H_2(g)+O_X^O \rightarrow H_2O(g)+V_O^{\cdot\cdot}+2e^- \quad (6)$$

All volatile matter released during heating of the coal will be oxidized at the anode as well.

In the present invention, before the $CO_2$-rich stream is directed to a sequestration site, it is employed in a dry gasification process to generate CO, which is then used in an arrangement of solid oxide fuel cells (SOFCs) to generate electricity. In all the examples and figures presented below, coal is intended as representative of all types of solid carbonaceous fuels, including but not limited to anthracite, biomass, coal, char, charcoal, forest residues, industrial carbon-containing wastes, lignite, manure, municipal solid wastes, paper pulp, peat, petroleum coke, refuse-derived wastes, saw dust, sewage sludge, solid wastes, or waste plastics. Similarly, examples of biomass include, but nor limited to wood, switchgrass, corn stover, rice straw, olive pits, grass, agricultural residues, and shells of almonds, walnuts, coconuts and other types of nuts.

Figure 2:
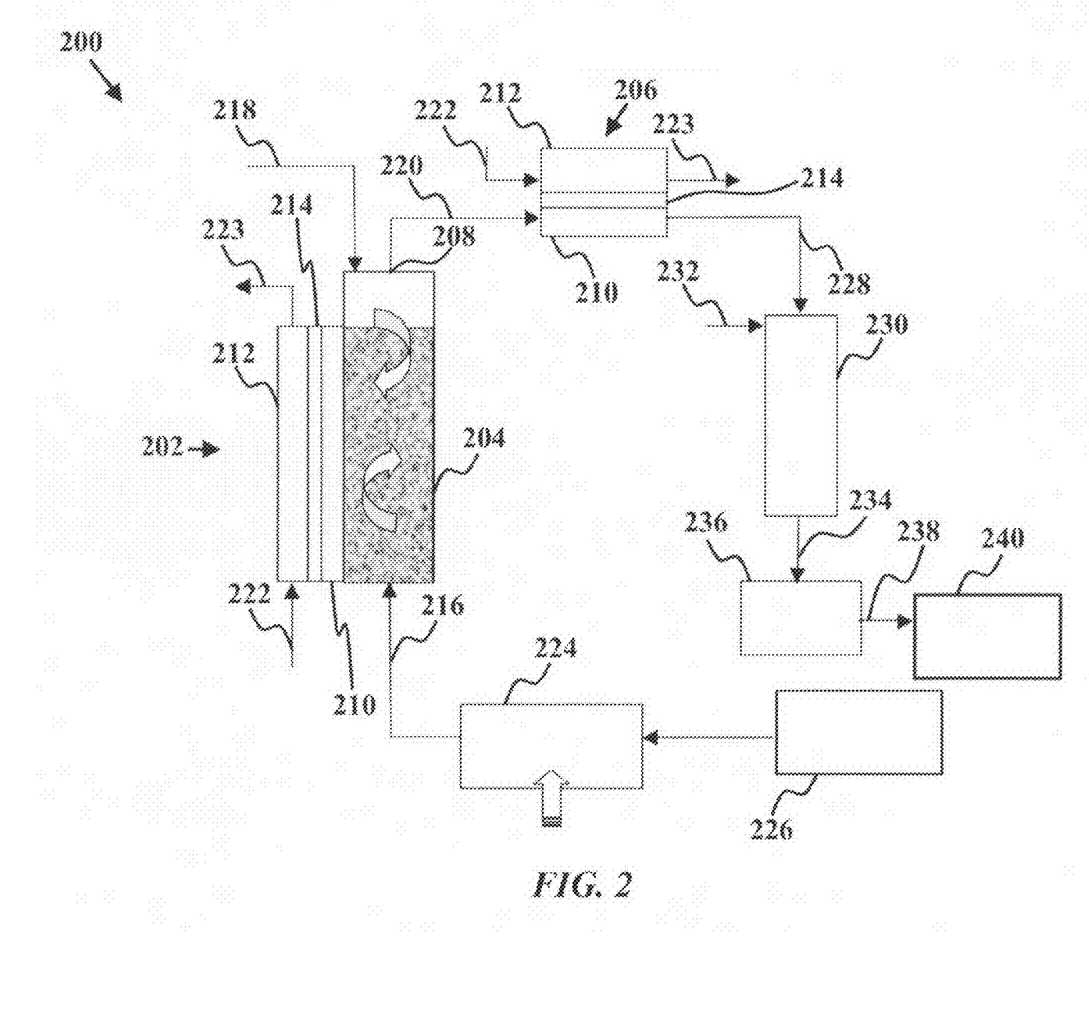
FIG. 2 shows a schematic of IDG-FC where the dry gasifier is integrated with an internal SOFC and external SOFC for electrical power extraction, with $CO_2$ and waste heat from a nearby coal-fired power plant according to the present invention.

According to one embodiment of the current invention, FIG. 2 shows a SOFC bundle configuration 200, where one internal SOFC 202 is used directly inside the gasifier (conversion bed) 204, and another external fuel cell bundle 206 is located at the gasifier exit 208. As shown, the fuel cell 202 includes an anode 210, a cathode 212 and an electrolyte membrane 214, where the membrane 214 is disposed between the anode 210 and the cathode 212. Carbon dioxide gas is provided to the conversion bed 206 through a carbon dioxide gas input 216 and the conversion bed 206 converts carbon monoxide gas from the carbon dioxide gas. Solid carbonaceous fuel is provided to the conversion bed 206 through a carbonaceous fuel input 218 to promote the gas conversion. The carbon monoxide is provided as fuel to the anode 210 through a fuel input 220, and air is supplied to the cathode 212 through an air input 222 and an air output 223 to provide oxygen and exhaust air for oxidation of the carbon monoxide at the anode 212 to generate electric power.

Further shown in FIG. 2 is an example of when the process of the current invention is located at a coal-fired power plant (not shown), and in many cases, an air separation unit (not shown) is available to permit combustion in oxygen. Here, integration with the power plant's waste heat streams in a waste heat recovery element 224 enables a heating the $CO_2$ before it enters the gasifier 204 through the carbon dioxide gas input 216, where the $CO_2$ may be provided from a gas separation unit 226. Also shown, the fuel cell 202/206 includes a product stream output 228 from the anode 210 that is input to a CO burner 230 having an $O_2$ input 232. The combustor 230 is used to oxidize any CO in the SOFC product stream 228. A CO burner exhaust stream 234 is input to a gas cleanup element 236 having an gas cleanup output $CO_2$ stream 238 for input to a sequestration site 240.

Although the gasification reactions are kinetically controlled and hence, relatively slow with respect to consumption of the solid carbon or char particles, a large amount of gas is generated when the gasifier is filled with an ample amount of coal. According to another embodiment, the $CO_2$ gas is restricted from entering said conversion bed 204. The power generated in the fuel cells 202/206 increases both the power output and efficiency of the power plant, and has the potential to offset the cost of the carbon capture and sequestration (CCS) system.

Figure 3:
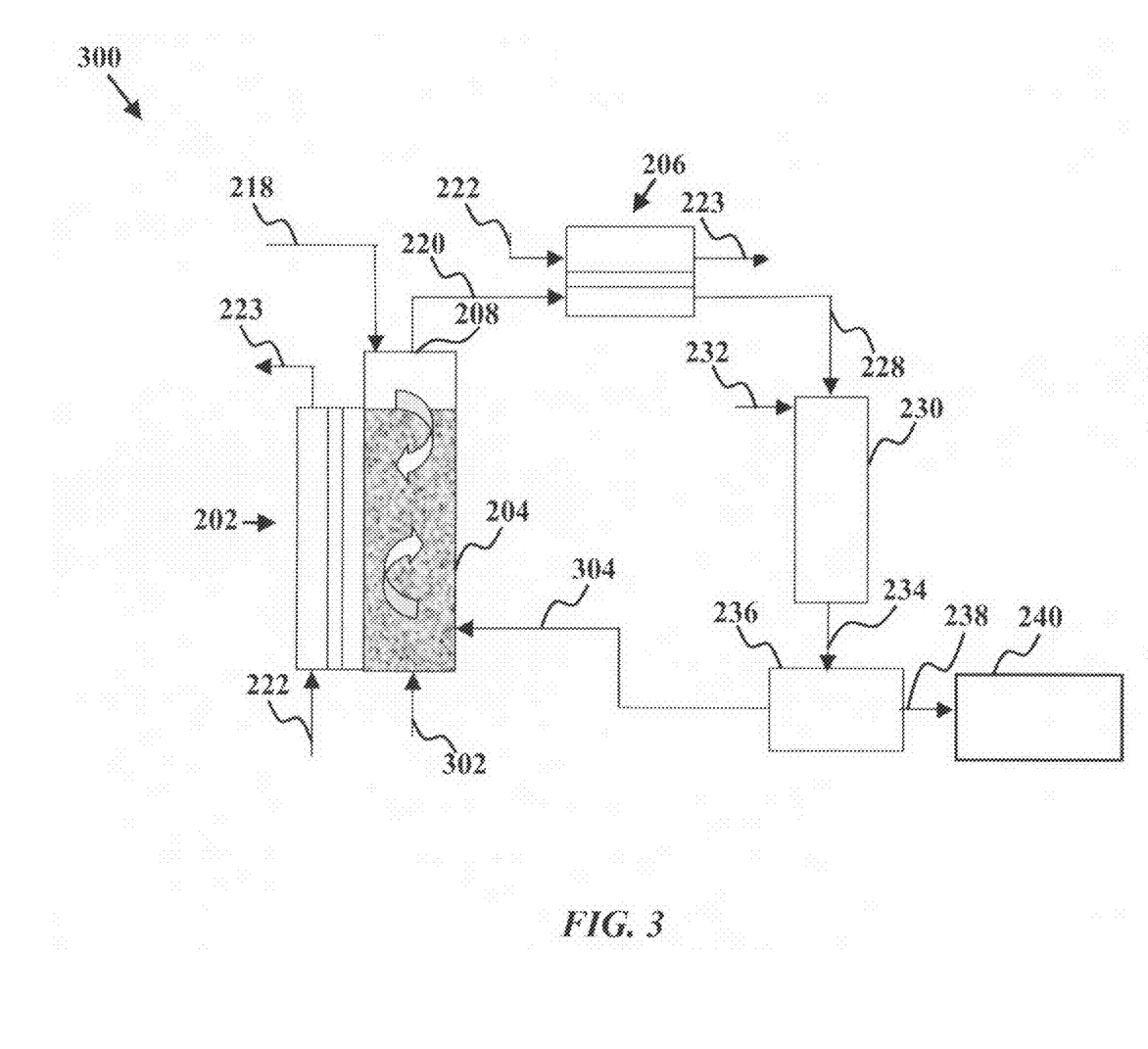
FIG. 3 shows a schematic of IDG-FC where the dry gasifier is integrated with an internal SOFC and external SOFC for electrical power extraction, in a stand-alone configuration according to the present invention.

FIG. 3 shows the IDG-FC process employed as a "standalone" electric power generation system 300. In this configuration, any additional process heat to IDG-FC that cannot be provided by the large difference in the enthalpies (see FIG. 1) of reactions (2) and (4) may be supplemented by supplying a sub-stoichiometric amount of oxygen through an $O_2$ input 302 to the gasifier 204 along with the $CO_2$ and carbonaceous fuel. The oxygen reacts with the coal releasing energy as heat, which adds to the strongly exothermic enthalpy of reaction (4) to drive the endothermic char-$CO_2$ gasification reactions. For example fresh coal enters the top of the gasifier 204 through the coal feed 218, and oxygen and preheated $CO_2$ enter the bottom. In this counter-flow arrangement, the sensible energy of the CO and $CO_2$ generated during exothermic char oxidation in the bottom regions of the gasifier 204 is used to drive the coal gasification reactions in the middle to upper regions of the gasifier 204. FIG. 3 shows additional energy to drive the endothermic gasification reactions is provided by the exhaust stream 234 of the combustor 230 used to oxidize any CO in the SOFC product stream 228. A portion of the hot $CO_2$ leaving the combustor 230 is recycled $CO_2$ 304 that is directed back to the gasifier 204 and a portion is directed to the intended $CO_2$ sequestration site 240.

Figure 4:
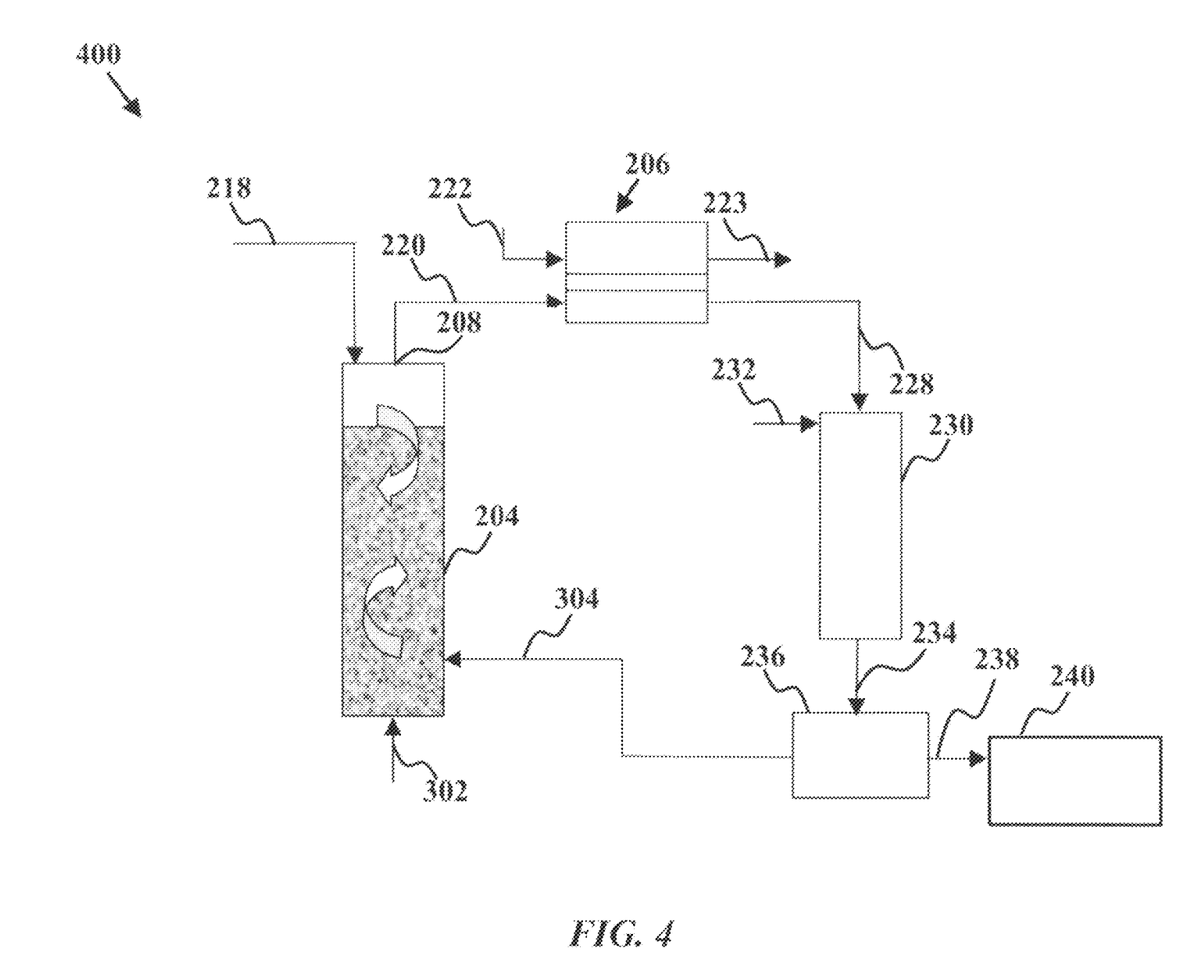
FIG. 4 shows a schematic of IDG-FC where the dry gasification process is integrated to an external SOFC for electrical power extraction, in a stand-alone configuration according to the present invention.

FIG. 4 shows a single SOFC embodiment 400 of the current invention, where only the external SOFC 206 is integrated to the gasifier 204. Here, the internal SOFC (not shown) can be omitted from the gasifier completely. In this configuration, the dry gasification products of CO and $CO_2$ can be fed to the external SOFC 206 to generate electricity.

In the embodiments of FIGS. 2, 3 and 4, water 516 (shown in FIG. 5) in substoichiometric amounts may be added to the gasifier 204 in order to enhance fuel cell kinetics and electric power generation capacity. Hydrogen formed in the gasifier 204 due to reactions between coal and water is oxidized in the internal SOFC 202 (see FIGS. 2 and 3) back to water again, increasing the power generation rate. Water in the stream of the gasifier exit 208 can be condensed before the stream enters the external SOFC bundle 206. Water in the stream directed to the sequestration site 226 must also be condensed from the stream. Water from all these sources can be recycled back to the gasifier 204.

Figure 5:
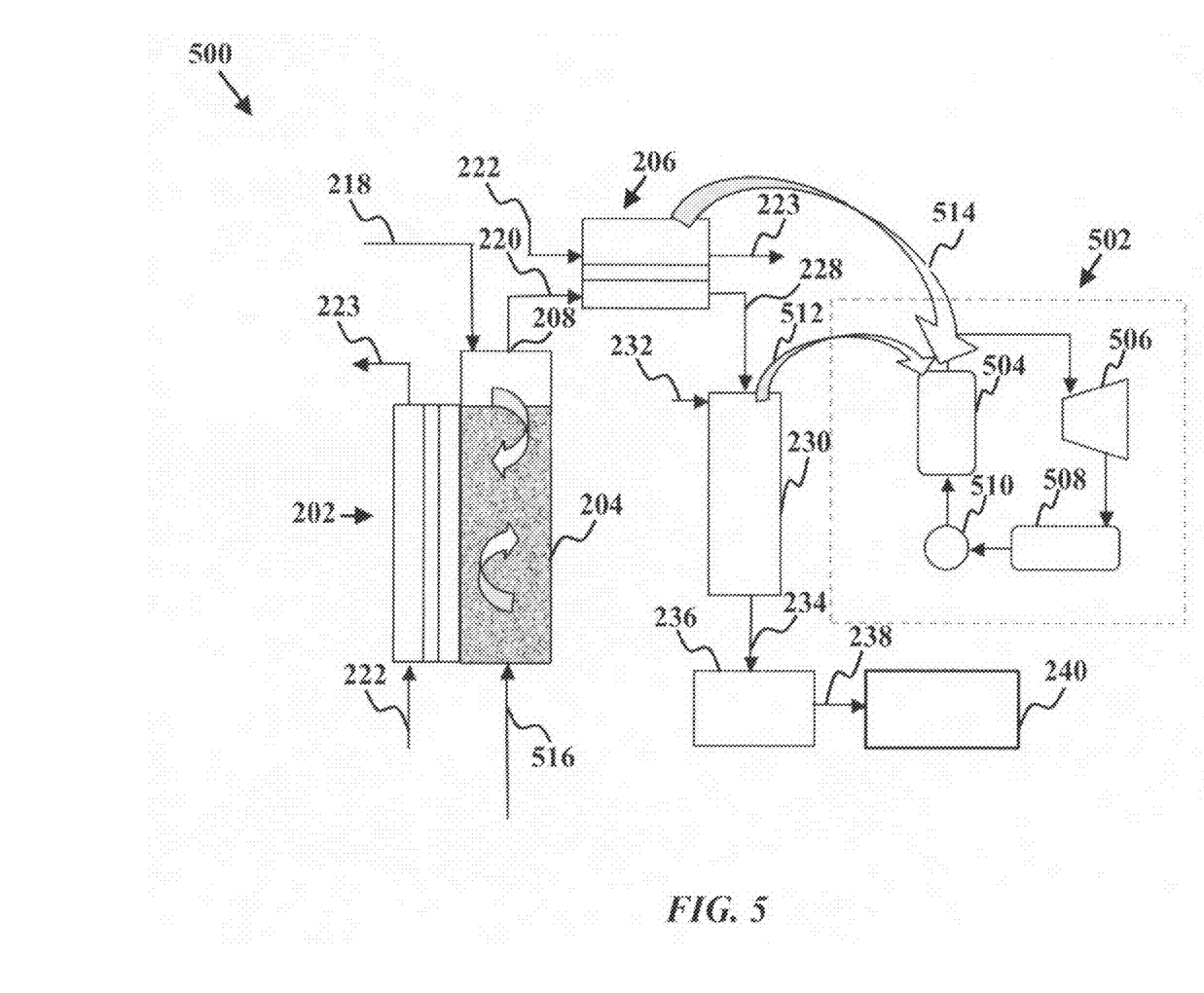
FIG. 5 shows a schematic of IDG-FC unit with a Rankine bottoming cycle for increased power output and efficiency according to the present invention.

FIG. 5 shows an IDG-FC and Rankin power cycle 500, where the external SOFC 206 integrated with a Rankine power cycle 502 for increased power output and efficiency. Heat engines and fuel cells must reject heat or hot products in accordance with the laws of thermodynamics. The Rankine bottoming cycle 502 includes a boiler 504 that provides steam to a steam turbine 506, where the output steam is input to a condenser 508 and the condensed water is input to a pump 510 to pump the water back into the boiler 504. The external SOFC 206 rejects heat at high temperature (nominally 900° C. for the DCFC), which can be utilized in a separate bottoming cycle to extract further work and increase efficiency. This is supplemented by the carbon monoxide burner 230, which also liberates and rejects heat at high temperature. Additional heat is available for the bottoming cycle 502 as DCFC products are cooled for gas cleanup. A Rankine cycle, of any complexity, is a natural choice of bottoming cycle for the DCFC due to the maximum steam turbine inlet temperature of about 600-650° C. This matches favorably with the nominally 900 C. heat rejection from the fuel cell. The addition of the steam bottoming cycle adds nominally 10% to the efficiency of the DCFC plant. In one embodiment of the invention, the external SOFC 206 uses the air exhaust 223 from the cathode 212, where heat energy from the exhaust air is reclaimed 514. The reclamation includes providing the cathode heat energy to the boiler 504 of a Rankine engine 502. In another embodiment, the external SOFC 206 further includes a product stream output 228 from the anode 210, where heat energy from the product stream output 228 is reclaimed 512. Here, the reclamation includes providing the anode heat energy to a boiler 504 of a Rankine engine 502.

The current invention provides many important advantages for improved efficiency in power plants. For example, there is only limited use the $CO_2$-rich stream that is separated from the flue gas of industrial coal-fired boilers and furnaces, these include the current industrial uses of $CO_2$ as in enhanced oil recovery, and extraction or separation processes using supercritical $CO_2$ as a powerful solvent. The current use is to divert this $CO_2$ stream directly to the sequestration site. The present invention provides a technological and business opportunity to further utilize this otherwise waste $CO_2$ stream. The gasification scheme with fuel cell integration disclosed here employs this stream to generate electricity from coal with increased efficiency.

The efficiency of a present-day pulverized coal-fired power plant is about 34%, consequently about 10,600 kJ of coal energy input is needed to produce a kWh of electricity. If the coal used were a typical high-volatile bituminous coal (C/H/O/N/S~70.0/4.6/6.8/1.3/1.3 percent by mass, with a higher heating value of ~30 MJ/kg), about 0.90 kg of $CO_2$ would be produced in the process. The newer supercritical pulverized coal-fired power plants have efficiencies near 38%, thereby requiring about 9500 kJ of coal energy input to generate a kWh of electricity, producing about 0.81 kg of $CO_2$. Based on these numbers, a 100 MWe power plant that uses a typical high-volatile bituminous coal as an energy source will produce as much as 25 kg/s of $CO_2$. With 25 kg/s of $CO_2$ and 32.6 kg/s of coal supplied to the gasifier and 19.6 kg/s of $O_2$ supplied through the SOFC, the potential exist to produce 405 MWe of additional power, assuming a cell operating voltage of 0.6 V. This provides over 42% conversion efficiency.

Having a fuel cell 202 located inside the gasifier 204 where the reactive gases are generated has the advantage of maintaining a uniform, high-concentration of CO along the surface of the anode 210 of the fuel cell 202. This enhances the transport of CO through the porous anode 210, thereby increasing the oxygen gradient across the electrolyte 214 of the fuel cell 202, increasing the fuel cell's power density. An advantage of using an internal SOFC 202 is that electric power can be generated as oxygen is supplied to oxidize the fuel.

Advantages of locating the facility at an IGCC coal-fired power plant include: (i) utilization of waste heat from the IGCC plant and (ii) access to and utilization of $O_2$ from the IGCC's existing air separation facility. Furthermore, the IDG-FG process will benefit from the existing infrastructure for coal delivery, storage, and grinding and for the existing power distribution grid.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example in FIG. 4, energy can be transferred as heat from the CO Burner to the gasifier, thereby driving the endothermic reactions, without the need to supply $O_2$ to the gasifier.

All such variations are considered to be within the scope and spirit of the present invention as defined by the following claims and their legal equivalents.

What is claimed:

1. An integrated dry gas fuel cell comprising:
   a. at least one carbon monoxide gas fueled solid oxide fuel cell, wherein the carbon monoxide gas fueled fuel cell comprises a carbon monoxide oxidizing anode, wherein an anodic oxidation of the carbon monoxide is provided by the carbon monoxide oxidizing anode in the presence of carbon monoxide, a cathode, an oxide ion transporting electrolyte membrane, and a product stream output from the carbon monoxide oxidizing anode, whereby the membrane is disposed between the carbon monoxide oxidizing anode and the cathode; and
   b. a dry gasifier, wherein the carbon monoxide gas fueled solid oxide fuel cell is integrated to the dry gasifier, wherein the dry gasifier converts carbon monoxide gas from carbon dioxide gas, whereas a packed bed of solid carbonaceous fuel is provided to the dry gasifier to facilitate the gas conversion, wherein the packed bed of solid carbonaceous fuel is in physical contact with the carbon monoxide oxidizing anode, wherein the carbon monoxide gas is directly provided as fuel to the carbon monoxide oxidizing anode inside the dry gasifier, wherein said at least one carbon monoxide gas fuel cell is physically and thermally integrated with said dry gasifier within a single chamber,
   wherein a Boudouard reaction product carbon dioxide is formed directly inside the at least one carbon monoxide gas fueled solid oxide fuel cell, wherein when an electrochemical oxidation reaction of the carbon monoxide occurs at a surface of the carbon monoxide oxidizing anode by oxide ions supplied through the oxide ion transporting electrolyte membrane from the cathode for the electrochemical oxidation reaction of the carbon monoxide gas at the surface of the carbon monoxide oxidizing anode to generate electric power, wherein the electrochemical oxidation reaction comprises $CO(g) + O_O^X \rightarrow CO_2(g) + V_O^{\cdot\cdot} + 2e^-$ yielding electrons for said electrical power generation.

2. The dry gas fuel cell of claim 1, wherein the fuel cell further comprises an air exhaust from the cathode, whereby heat energy from the exhaust air is reclaimed.

3. The dry gas fuel cell of claim 2, wherein the reclamation comprises providing the cathode heat energy to a boiler of a Rankine engine.

4. The dry gas fuel cell of claim 1, wherein heat energy from the product stream output is reclaimed.

5. The dry gas fuel cell of claim 4, wherein the reclamation comprises providing the carbon monoxide oxidizing anode heat energy to a boiler of a Rankine engine.

6. The dry gas fuel cell of claim 1, wherein the electrolyte membrane is an oxide ion selective membrane, whereby the oxide ion selective membrane only transports oxide ions, whereas the membrane supplies oxygen to the carbon monoxide oxidizing anode for an anodic oxidation of the carbon monoxide provided from the dry gasifier.

7. The dry gas fuel cell of claim 6, wherein the oxide ion selective membrane comprises electrolyte material, whereby the electrolyte material is selected from a group consisting of zirconia-based electrolytes, zirconia-based electrolytes doped with alkali or rare earth oxides, zirconia-based electrolytes in a cubic fluorite phase, ceria-based electrolytes, ceria-based electrolytes doped rare earth oxides, ceri-base electrolytes in a cubic fluorite phase, lanthanum gallate-based electrolytes, lanthanum gallate-based electrolytes doped with oxides of aliovalent metals, lanthanum gallate-based oxides of perovskite phase, zirconia-based electrolytes in a pyrocholore phase, lanthanum silicate-based electrolytes, lanthanum silicate-based electrolytes doped with oxides of aliovalent metals, and lanthanum silicate-based electrolytes in an apatite phase.

8. The dry gas fuel cell of claim 1, wherein the carbon dioxide is provided to the dry gasifier from a carbon dioxide reclamation element.

9. The dry gas fuel cell of claim 8, wherein a waste-heat recovery element is disposed between the carbon dioxide reclamation element and the dry gasifier, whereby the carbon dioxide is heated before entering the dry gasifier, whereas the gas conversion is further promoted.

10. The dry gas fuel cell of claim 1, wherein the carbon dioxide gas is provided to the dry gasifier.

11. The dry gas fuel cell of claim 1, wherein the solid carbonaceous fuel comprises a solid fuel with a carbon content greater than 20% by weight on a dry-basis.

12. The dry gas fuel cell of claim 1, wherein the solid carbonaceous fuel is selected from a group consisting of anthracite, biomass, coal, char, charcoal, forest residues, industrial carbon-containing wastes, lignite, municipal solid wastes, paper pulp, peat, petroleum coke, refuse-derived wastes, sewage sludge, solid wastes, and waste plastics.

13. The dry gas fuel cell of claim 1 further comprises a fuel cell bundle, wherein the bundle comprises at least one the fuel cell disposed inside the dry gasifier and at least one the fuel cell disposed at an exit of the dry gasifier.

14. The dry gas fuel cell of claim 1, wherein the dry gasifier further comprises an oxygen input comprising oxygen gas for combustion, wherein the oxygen input is disposed to direct the oxygen gas for combustion to the dry gasifier, wherein the directed oxygen gas for combustion forms combustion heat in a combustor, wherein the combustor provides combustion heat and promotes the gas conversion.

* * * * *